United States Patent
Muys et al.

(10) Patent No.: US 6,225,040 B1
(45) Date of Patent: May 1, 2001

(54) PERMANENT ANTISTATIC PRIMER LAYER

(75) Inventors: Bavo Muys, Mortsel; Dirk Quintens, Lier; Jozef Boeykens, Bornem; Etienne Van Thillo, Essen; Geert Defieuw, Temse, all of (BE)

(73) Assignee: Agfa-Gevaert, Mortsel (BE)

( * ) Notice: Subject to any disclaimer, the term of this patent is extended or adjusted under 35 U.S.C. 154(b) by 0 days.

(21) Appl. No.: 08/356,573

(22) Filed: Dec. 15, 1994

Related U.S. Application Data

(62) Division of application No. 08/162,772, filed on Dec. 8, 1993, now Pat. No. 5,391,472.

(30) Foreign Application Priority Data

Dec. 17, 1992 (EP) .................................................. 92203978

(51) Int. Cl.⁷ ...................................................... G03C 1/76
(52) U.S. Cl. .......................... 430/533; 430/527; 430/935; 428/327; 428/483
(58) Field of Search ..................................... 430/527, 533, 430/496, 510, 502, 935, 523; 264/289; 428/323, 327, 411.1, 480, 341, 483

(56) References Cited

U.S. PATENT DOCUMENTS

| | | | |
|---|---|---|---|
| 3,683,060 | * 8/1972 | Tanabe et al. | 264/289 |
| 4,910,645 | * 3/1990 | Jonas et al. | 361/525 |
| 5,300,575 | * 4/1994 | Jonas et al. | 525/186 |
| 5,312,681 | * 5/1994 | Muys et al. | 428/323 |
| 5,354,613 | * 10/1994 | Quintens et al. | 428/341 |
| 5,391,472 | * 2/1995 | Muys et al. | 430/527 |

FOREIGN PATENT DOCUMENTS

| | | | |
|---|---|---|---|
| 0553502 | * 8/1993 | (EP) | 430/527 |
| 0308245 | * 12/1990 | (JP) | 430/527 |

OTHER PUBLICATIONS

Karlheinz Keller, Science and Technology of Photography, pp.s 63–68 and 242, Weinheim, 1993.*

* cited by examiner

*Primary Examiner*—Christopher G. Young
(74) *Attorney, Agent, or Firm*—Breiner & Breiner

(57) ABSTRACT

There is provided a method for preparing a biaxially oriented polyester sheet or web, with improved antistatic properties, comprising the steps of (i) stretching said polyester sheet or web first in one direction and second in a direction perpendicular thereto (ii) coating said hydrophobic polyester sheet or web, either before stretching or between said first and second stretching operation, on one or both sides, with a transparent antistatic primer layer, wherein the coating composition of said transparent antistatic primer layer comprises (1) a dispersion of a polythiophene with conjugated polymer backbone and a polymeric polyanion compound and (2) a latex polymer having hydrophilic functionality. The primer layer is coated from an aqueous composition and does not show a substantial change in resistivity depending on relative humidity or wet processing.

12 Claims, No Drawings

PERMANENT ANTISTATIC PRIMER LAYER

This is a division of application Ser. No. 08/162,772 filed Dec. 8, 1993 U.S. Pat. No. 5,391,472.

FIELD OF THE INVENTION

The present invention relates to a sheet or web material having antistatic properties, and is particularly but not exclusively concerned with recording materials wherein a hydrophobic resin support carries an antistatic subbing layer imparting good adherence to a hydrophilic colloid-containing layer, e.g. a light-sensitive gelatin-silver halide emulsion layer.

BACKGROUND OF THE INVENTION

It is known that hydrophobic resin sheet and web materials of low conductivity readily become electrostatically charged by friction with dielectric materials and/or contact with electrostatically chargeable transport means, e.g. rollers. The charging occurs particularly easily in a relatively dry atmospheric environment.

Sheets and webs of hydrophobic resins, e.g. polyesters or cellulosetriacetate, are commonly used as support element of recording materials. Such materials are subjected to frictional contact with other elements during their manufacture, e.g. during coating or cutting, and during use, e.g. during the recording of information, e.g. with a step-and-repeat camera or in the case of silver halide photographic materials for X-ray diagnosis during use in film-changers or when used in film loading and unloading in so-called daylight systems.

Especially in the reeling-up or unreeling of dry photographic film in a camera or projector high friction may occur, resulting in electrostatic charges that may attract dust or cause sparking. In unprocessed photographic silver halide emulsion materials sparking gives rise to developable fog and degrades the image quality.

In order to reduce electrostatic charging of photographic sheet or web materials comprising a hydrophobic resin support coated with at least one silver halide emulsion layer without impairing their transparency it is known to incorporate ionic compounds in these materials, e.g. in the gelatin-silver halide emulsion layer(s) or other hydrophilic colloid layers or in a subbing layer.

In order to avoid diffusion of ionic compounds out of said layers during the wet processing treatments of said materials, preference has been given to incorporate therein antistatic high molecular weight polymeric compounds having ionic groups, e.g. carboxylic sodium salt groups, at frequent intervals in the polymer chain [ref. Photographic Emulsion Chemistry, by G. F. Duffin,—The Focal Press—London and New York (1966)—Focal Press Ltd., p. 168]. To further enhance the permanence of the conductivity of ionic conductive polymers it has been proposed to cross-link these polymers with hydrophobic polymers (ref. e.g. U.S. Pat. Nos. 4,585,730, 4,701,403, 4,589,570, 5,045,441, EP-A-391 402 and EP-A-420 226).

The conductivity however of an antistatic layer containing said ionic conductive polymers, even after cross-linking, is moisture dependent and is lowered considerably by treatment with an acidic photographic processing liquid, e.g. an acidic photographic fixing liquid or stop bath.

Relatively recently electrically-conducting conjugated polymers have been developed that have electronic conductivity. Representatives of such polymers are described in the periodical Materials & Design Vol. 11, No. 3—June 1990, p. 142–152, and in the book "Science and Applications of Conducting Polymers"—Papers from the 6th European Physical Society Industrial Workshop held in Lothus, Norway, May 28–31, 1990, Edited by W R Salaneck Linkoping University, D T Clark ICI Wilton Materials Research Centre, and E J Samuelson University of Trondheim, published under the Adam Hilger imprint by IOP Publishing Ltd Techno House, Redcliffe Way, Bristol BS1 6NX, England.

Substances having electronic conductivity instead of ionic conductivity have a conductivity independent from moisture. They are particularly suited for use in the production of antistatic layers with permanent and reproducible conductivity.

Many of the known electronically conductive polymers are highly coloured which makes them less suited for use in photographic materials, but some of them of the group of the polyarenemethylidenes, e.g. polythiophenes and poly-isothianaphthene are not prohibitively coloured and transparent, at least when coated in thin layers.

The production of conductive polythiophenes is described in preparation literature mentioned in the above mentioned book: "Science and Applications of Conducting Polymers", p. 92.

The production of colour neutral conducting polymers from isothionaphthene is described in J Electrochem Soc 134, (1987) 46.

For ecological reasons the coating of antistatic layers should proceed where possible from aqueous solutions by using as few as possible organic solvents. The production of antistatic coatings from aqueous coating compositions being dispersions of polythiophenes in the presence of polyanions is described in published European patent application 0 440 957 and corresponding U.S. Ser. No. 647,093 which should be read in conjunction herewith.

It is known that the electrostatic chargeability of polyester resin is high and that for many applications it would be interesting to lower its surface resistance e.g. by applying thereto a conductive primer or subbing layer. It is however also known that it is difficult to establish a good bonding between a polyester resin support and a hydrophilic antistatic layer. In most cases more than one layer is needed to impart sufficient adherence of a hydrohilic colloid layer to a polyester resin support as is the case e.g. in photographic materials, having one or more hydrophilic colloid recording layers such as gelatin-silver halide emulsion layers. Normally, a first special adhesion layer is coated on the support to adhere thereto a proper antistatic layer, which may be protected with a protective layer for avoiding mechanical damage and attack by solvents.

It is common practice to give a polyester film support a sufficient dimensional stability by biaxially stretching and to heat-set it at relatively high temperature. Usually the biaxially orientation of the polyester film support is performed in two stages. First the film is stretched in one direction and afterwards in a direction perpendicular to the first. From an economic point of view it would be advantageous if an antistatic primer layer on the polyester film could be applied either before or between the stretching operations. Applied in the stretching stage the primer layer should retain a good anchorage and its elastic modulus should be such that it easily follows the film enlargement in the stretching. The elastic modulus is the ratio of stress (force per unit area) to strain, the latter being a pure number representing the percentage of elongation (ref. Sears & Zemansky "University Physics", 4th ed.—Addison-Wesley Publishing Company—Reading, Mass., USA, p. 154–155).

After the biaxial stretching the film is conducted through a heat-setting zone wherein the primed polyester film such as a polyethylene terephthalate film is heated until a temperature between 180° and 220° C. is reached, while the film is kept under tension in both directions.

The primer layer should withstand these temperatures without prohibitive colouration and not loose its conductivity when incorporating electrically conductive material.

OBJECT AND SUMMARY OF THE INVENTION

It is an object of the present invention to provide a sheet or web material which includes a hydrophobic polyester resin support, carrying a transparent antistatic primer layer that possesses good adherance to said support in dry and wet state and can be subjected to stretching together with said polyester resin support without loosing its adherance thereto and without substantial colouration in the heat-treatment during and following said stretching.

It is a further object of the present invention to provide a sheet or web type photographic gelatin-silver halide emulsion layer material containing said primed support, that through said antistatic primer layer obtains permanent antistatic properties, i.e. does not show a substantial change in resistivity depending on relative humidity of the atmosphere or the influence of wet processing.

Other objects and advantages of the present invention will become clear from the further description and examples.

In accordance with the present invention there is provided a method for preparing a biaxially oriented polyester sheet or web, with improved antistatic properties, comprising the steps of (i) stretching said polyester sheet or web first in one direction and second in a direction perpendicular thereto (ii) coating said hydrophobic polyester sheet or web, either before stretching or between said first and second stretching operation, on one or both sides, with a transparent antistatic primer layer, wherein the coating composition of said transparent antistatic primer layer comprises (1) a dispersion of a polythiophene with conjugated polymer backbone and a polymeric polyanion compound and (2) a latex polymer having hydrophilic functionality.

By "latex polymer" is understood a polymer or copolymer that is applied as an aqueous dispersion (latex) of particles of said polymer or copolymer.

By "hydrophilic functionality" is meant a chemical group having affinity for water e.g. a sulphonic acid or carboxylic acid group preferably in salt form e.g. an alkali metal salt group.

DETAILED DESCRIPTION OF THE INVENTION

Polythiophene/Polyanion Dispersion

Preferably said polythiophene has thiophene nuclei substituted with at least one alkoxy group, or —O(CH$_2$CH$_2$O)$_n$CH$_3$ group, n being 1 to 4, or thiophene nuclei that are ring closed over two oxygen atoms with an alkylene group including such group in substituted form. "Ring closed over two oxygen atoms" has to be understood that two adjacent carbon atoms of the thiophene ring together with an oxyalkylene-oxy group form an adjacent ring. Preferred polythiophenes for use according to the present invention are made up of structural units corresponding to the following general formula (I):

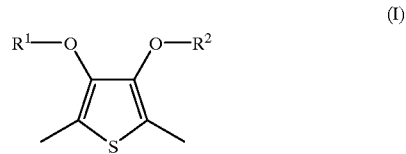

in which:
each of R$^1$ and R$^2$ independently represents hydrogen or a C$_{1-4}$ alkyl group or together represent an optionally substituted C$_{1-4}$ alkylene group or a cycloalkylene group, preferably an ethylene group, an optionally alkyl-substituted methylene group, an optionally C$_{1-12}$ alkyl- or phenyl-substituted 1,2-ethylene group, a 1,3-propylene group or a 1,2-cyclohexylene group.

The preparation of said polythiophene and of aqueous polythiophene-polymeric polyanion dispersions containing said polythiophene is described in published European patent application 0 440 957 and corresponding U.S. Ser. No. 647,093.

The preparation of said polythiophene proceeds in the presence of said polymeric polyanion compounds by oxidative polymerization of 3,4-dialkoxythiophenes or 3,4-alkylenedioxythiophenes according to the following general formula (II):

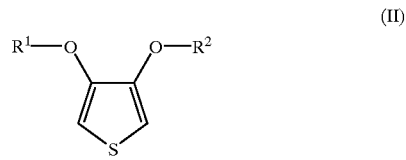

wherein:
R$^1$ and R$^2$ are as defined in general formula (I), with oxidizing agents used e.g. for the oxidative polymerization of pyrrole and/or with oxygen or air in the presence of said polyacids, preferably in aqueous medium containing optionally a certain amount of organic solvents, at temperatures of 0 to 100° C.

The polythiophenes get positive charges by the oxidative polymerization, the location and number of said charges is not determinable with certainty and therefore they are not mentioned in the general formula of the repeating units of the polythiophene polymer.

When using air or oxygen as the oxidizing agent their introduction proceeds into a solution containing thiophene, polyacid, and optionally catalytic quantities of metal salts till the polymerization is complete.

Oxidizing agents suitable for the oxidative polymerization of thiophene, according to the present invention, may be the same as those that are described, for example, in J. Am. Soc. 85, 454 (1963) as suitable for the oxidative polymerization of pyrrole. Inexpensive and easy-to-handle oxidizing agents are preferred such as iron(III) salts, e.g. FeCl$_3$, Fe(ClO$_4$)$_3$ and the iron(III) salts of organic acids and inorganic acids containing organic residues, likewise H$_2$O$_2$, K$_2$Cr$_2$O$_7$, alkali or ammonium persulfates, alkali perborates, potassium permanganate and copper salts such as copper tetrafluoroborate.

Theoretically, 2.25 equivalents of oxidizing agent per mol of thiophene are required for the oxidative polymerization thereof [ref. J. Polym. Sci. Part A, Polymer Chemistry, Vol.

26, p.1287 (1988)]. In practice, however, the oxidizing agent is used in a certain excess, for example, in excess of 0.1 to 2 equivalents per mol of thiophene.

For the polymerization, the thiophenes corresponding to the above general formula (II) a polyacid and oxidizing agent are dissolved or emulsified in an organic solvent or preferably in water and the resulting solution or emulsion is stirred at the envisaged polymerization temperature until the polymerization reaction is completed. By that technique stable aqueous polythiophene dispersions are obtained having a solids content of 0.05 to 55% by weight and preferably of 0.1 to 10% by weight.

The polymerization time may be between a few minutes and 30 hours, depending on the size of the batch, the polymerization temperature and the kind of oxidizing agent. The stability of the obtained polythiophene/polyanion dispersion may further be improved during and/or after the polymerization by the addition of dispersing agents, e.g. anionic surface active agents such as dodecyl sulfonate, alkylaryl polyether sulfonates described in U.S. Pat. No. 3,525,621.

The size of the polythiophene particles in the polythiophene/polyanion dispersion is in the range of from 5 nm to 1 µm, preferably in the range of 40 to 400 nm.

Suitable polymeric polyanion compounds for use in the presence of said polythiophenes, according to the present invention, are provided by acidic polymers in free acid form or by a salt of said acidic polymers. The acidic polymers are preferably polymeric carboxylic or sulphonic acids. Examples of such polymeric acids are polymers containing repeating units selected from the group consisting of acrylic acid, methacrylic acid, maleic acid, vinyl sulfonic acid and styrene sulfonic acid or mixtures thereof.

The anionic (acidic) polymers used in conjunction with the dispersed polythiophene polymer to form the polythiophene/polyanion dispersion to be used according to the present invention, have preferably a content of anionic groups of more than 2% by weight with respect to said polymer compounds to ensure sufficient stability of the dispersion. Suitable acidic polymers or corresponding salts are described e.g. in DE-A-25 41 230, DE-A-25 41 274, DE-A-28 35 856, EP-A-14 921, EP-A-69 671, EP-A-130 115, U.S. Pat. Nos. 4,147,550, 4,388,403 and 5,006,451.

The polymeric polyanion compounds may consist of straight-chain, branched chain or crosslinked polymers. Cross-linked polymeric polyanion compounds with a high amount of acidic groups are swellable in water and are named microgels. Such microgels are disclosed e.g. in U.S. Pat. Nos. 4,301,240, 4,677,050 and 4,147,550.

The molecular weight of the polymeric polyanion compounds being polyacids is preferably in the range from 1,000 to 2,000,000 and more preferably in the range from 2,000 to 500,000. Polyacids within the above criteria are commercially available, for example polystyrene sulfonic acids and polyacrylic acids, or may be produced by known methods (ref. e.g. Houben-Weyl, Methoden der Organischen Chemie, Vol. E20, Makromolekulare Stoffe, Teil 2, (1987), pp. 141 et seq.).

Instead of the free polymeric polyacids applied in conjunction with the polythiophenes it is possible to use mixtures of alkali salts of said polyacids and non-neutralized polyacids, optionally in the presence of monoacids. Free acid groups of the polyanionic polymer may be allowed to react with an inorganic base, e.g. with sodium hydroxide, to obtain a neutral polymer dispersion before coating.

The weight ratio of polythiophene polymer to polymeric polyanion compound(s) can vary widely, for example from about 50/50 to 15/85.

The Latex Polymer

The latex polymer used in conjunction with the said polythiophene provides through its film forming character upon drying and its hydrophilic functionality a good bonding between the polyester film support and thereon applied hydrophilic layers.

The "latex polymer" applied in admixture with said polythiophene and polymeric anion compound is preferably a copolyester containing sulphonic acid groups in salt form, but other polyesters, such as the copolyesters having hydrophilic functionality as described e.g. in U.S. Pat. Nos. 3,563,942, 4,252,885, 4,340,519, 4,394,442 and 4,478,907, may be used likewise.

Preferred copolyesters contain a certain amount of sulphonic acid groups in salt form (ref. GB-P 1,589,926) and as described in U.S. Pat. No. 4,478,907 and EP 78 559 and for raising their glass transition temperature (Tg) contain an amount of particular co-condensated cross-linking agent(s). Such copolyesters contain e.g. recurring ester groups derived from ethylene glycol and an acid mixture containing (i) terephthalic acid, (ii) isophthalic acid, (iii) 5-sulphoisophthalic acid whose sulpho group is in salt form and (iv) a polyfuctional acid producing crosslinks.

In a particularly preferred embodiment the copolyester is a copolyester containing recurring ester groups derived from ethylene glycol and an acid mixture containing terephthalic acid, isophthalic acid and 5-sulphoisophthalic acid whose sulpho group is in salt form, said acid mixture consisting essentially of from 20 to 60 mole % of isophthalic acid, 6 to 10 mole % of said sulphoisophthalic acid, 0.05 to 1 mole % of cross-linking agent being an aromatic polycarboxylic acid compound having at least three carboxylic acid groups or corresponding acid generating anhydride or ester groups, the remainder in said acid mixture being terephthalic acid.

Although said copolyesters, having hydrophilic functionality through said sulfonic acid (salt) group are preferred, likewise addition (co)polymers having hydrophilic functionality may be used with satisfactory results.

According to a particular embodiment of the present invention the coating composition of the primer layer contains in admixture to the already mentioned polythiophene/polyanion dispersion and copolyester latex, an addition polymer or copolymer in latex form and having hydrophilic functionality. Such (co)polymers are disclosed in e.g. EP-A-386 529, U.S. Pat. No. 3,861,924, Research Disclosure n° 162, October 1977 p. 47–49 item 16 258, U.S. Pat. Nos. 4,225,665 and 4,689,359. Further polyurethanes having hydrophilic properties as disclosed in U.S. Pat. No. 4,388,403 may be used as latex polymers.

In the coating composition for coating an antistatic primer layer according to the present invention, said addition polymer is preferably a copolymer formed from 45 to 70% by weight of a lower (C1–C4) alkyl methacrylate, 25 to 50% by weight of butadiene and from 2 to 5% by weight of an ethylenically unsaturated carboxylic acid.

An example of a very suitable addition polymer applied in latex form and having hydrophilic functionality is a copolymer of vinylidene chloride and an unsaturated carboxylic acid as described e.g. in U.S. Pat. No. 3,649,336. Preferably such an addition copolymer is a copolymer formed from 60 to 90% by weight of vinylidenechloride, 9 to 30% of a lower (C1–C4) alkyl methacrylate and from 1 to 5% by weight of an ethylenically unsaturated carboxylic acid.

Coating of the Antistatic Primer Layer

The anstistatic layer according to the present invention can be coated onto the polyester sheet or web before the stretching operations of said polyester sheet or web material. Advantageously the coating proceeds between the two stretching operations of a polyethylene terephthalate film web, wherein the stretching ratio of both stretching operation may be between 2.5:1 to 4.0:1.

The anstistatic layer of this invention may have after drying and co-stretching with the resin support a thickness in the range of 0.001 to 5 μm, preferably the thickness is in the range of 0.01 to 0.5 μm.

The anstistatic layer according to this invention can be coated on one or on both sides of the support and to improve the spreading of the antistatic primer layer a surface active agent may be added to the coating solution. For that purpose anionic as well as non-ionic wetting agents may be used, e.g. a $C_{12}$–$C_{18}$ alkylphenol polyethyleneoxide ether such as dodecylphenol polyethylene oxide ether, p-nonyl phenoxy polyglycidol, iso-octyl-phenylene-(O—$CH_2$—$CH_2$)$_8$—O—$CH_2$—COOH sold under the tradename AKYPO OP80 by CHEMY, the Netherlands, or saponine. It is clear that other surface-active agents may be used and that their favourable influence on reduction of surface resistivity can be checked by simple tests. A survey of surface-active agents is given e.g. in Tensid-Taschenbuch Herausgegeben von Dr. Helmut Stache—Carl Hanser Verlag München Wien (1979).

The coating composition may contain aliphatic polyhydroxy compounds as stretch improving agents (e.g. glycerol, sorbitol, etc.) as described in U.S. Pat. No. 4,089,997 and a monomeric carboxylic acid as a viscosity regulating agent (e.g. furancarboxylic acid, malonic acid and glutaric acid) as described in U.S. Pat. No. 4,089,997.

The coating composition may contain additional antistatic agents e.g. metal oxides as described e.g. in U.S. Pat. No. 5,006,451 or colloidal silica having preferably an average particle size not larger than 100 nm, preferably not larger than 50 nm.

Colloidal silica having an average grain size between 5 and 100 nm is available in aqueous colloidal dispersions and is marketed under the commercial names LUDOX (trade name of E. I. du Pont de Nemours, Wilmington, Del. U.S.A., and SYTO (trade name of Monsanto Chemical Corporation, Boston Mass. USA) and KIESELSOL (trade name of Bayer AG, Leverkusen, Germany). Particularly suited is KIESELSOL 100 F wherein the colloidal silica has a particle size in the range of 25 to 30 nm.

In the preparation of a photographic silver halide emulsion layer material the anstistatic primer layer can be coated directly with the silver halide emulsion.

When a single sided silver halide emulsion layer material is prepared on a polyester sheet or web material that is coated on both sides with an antistatic primer layer according to the present invention, the side opposite to the silver halide emulsion layer can have on the anstistatic layer a protective layer consisting of an hydrophobic organic polymer having a glass transition temperature value (Tg) of at least 40° C. to become an outermost backing layer. The hydrophobic polymer used as protective layer on an antistatic layer according to this invention is preferably polymethylmethacrylaat having a Tg value above 100° C.

The antistatic primer layer of the present invention can be coated with a hydrophilic subbing layer containing a certain amount of hydrophilic colloid such as gelatin.

Such subbing layer may have a composition as described for layer (B) in U.S. Pat. No. 3,649,336 and corresponding GB-P 1,234,755. Said subbing layer comprises e.g. in a weight ratio of 1:3 to 1:0.5 a mixture of gelatin and colloidal silica. The coating composition of said subbing layer may contain wetting agents improving the spreading of the coating and plasticizers, e.g. polyoxyalkylene compounds and polyols and the gelatin plasticizers described in published EP-A 0 078 559 improving the flexibility of the coating.

Further said subbing layer may contain matting agents, biocides, light-absorbing or reflecting pigments, e.g. carbon black and/or titanium dioxide and/or bleachable dyes.

The thickness of the dried subbing layer may vary between 0.10 and 5 μm, and is normally about 1 μm.

A photographic silver halide emulsion material containing an antistatic primer layer according to the present invention as defined hereinbefore may contain (a) silver halide emulsion layer(s) of any type known to those skilled in the art. For example, these materials may contain a silver halide emulsion layer of the type used in continuous tone or halftone photography, microphotography and radiography. The defined antistatic primer layer be used advantageously in black-and-white or colour photographic materials and likewise in silver halide emulsion layers intended for use in the silver complex diffusion transfer reversal (DTR) process as well as in a dye diffusion transfer process operating with silver halide emulsion layers.

For the composition of silver halide emulsion layers reference is made e.g. to Research Disclosure 17,643 of December 1978 and Research Disclosure 307,105 of November 1989.

Apart from light-sensitive hydrophilic gelatin-silver halide emulsion layers any other gelatin-containing layer that has not to be photosensitive may be applied directly to the anstistatic primer layer or to the subbed anstistatic layer. For example, said gelatin-containing layer is an anti-halation layer, anti-curl layer, gelatinous image-receiving layer containing physical development nuclei for use in diffusion transfer reversal photography (DTR-photography) or is a gelatinous image-receiving layer containing a mordant for image-wise transferred dyes. The principles and embodiments of silver image formation by DTR-photography are described e.g. by André Rott and Edith Weyde in the book "Photographic Silver Halide Diffusion Processes"—The Focal Press London and New York (1972), and the principles and embodiments of the production of colour images by dye diffusion transfer are described e.g. by C. Van de Sande in Angew. Chem. Int. Ed. Engl. 22, (1983) p. 191–209.

The coating of a hydrophilic gelatin-containing subbing layer on the anstistatic primer layer may be omitted when the layer to be adhered to said antistatic primer layer does not contain gelatin but includes a less hydrophilic colloidal binder material, e.g. polyvinyl alcohol derived from partially hydrolyzed polyvinyl acetate, and alkali-soluble acrylic type polymers and copolymers containing free carboxylic acid groups, which polymers may be applied in formulations for the production of photo-resists as described e.g. in European Patent Specification (EP) 0 036 221.

By the above defined antistatic primer layer it is possible to reduce the surface resistance of a resin sheet or web material to a value lower than $10^{10}$ Ω/square at relative humidity (R.H.) of 30%.

The surface resistance expressed in Ω/square (ohm/sq.) of the above defined antistatic layer is measured according to test procedure A as follows:

after coating, the resulting antistatic layer or its assemblage with overlying layer(s) is dried and conditioned at a specific relative humidity (R.H.) and temperature. The surface resistance expressed in ohm per square (Ω/square) is performed by placing onto the outermost layer two conductive poles having a length of 10 cm parallel to each other at a distance of 1 cm and measuring the resistance built up between the electrodes with a precision ohm-meter (ref. DIN 53482).

According to test procedure B (described in the periodical Research Disclosure—June 1992, item 33840) the resistance of the layer assemblage is measured contact-less by arranging it between capacitor plates making part of a RC-circuit differentiator network. The dimensions of the measurement cell are chosen in such a way that relying on the known capacitor value (C) it is possible to calculate from the measured RC-value the electrical resistance of the layer assemblage. Such proceeds by introducing an electrical pulse into the measurement circuit and recording the discharge curve which yields the time τ=R×C, wherein the applied charge and voltage of the electrical pulse have droppped to its 1/e value (e is the base number of the natural logarithms). Applying an alternating current voltage with frequency (f), considering the RC-circuit as a high frequency pass filter, it is possible to find the resistance by using the equation: f=1/2π×R×C at the 3 dB point.

The discharge duration (termed as τ) to the value 1/e of the original voltage and charge in the series resistance (R) and capacitor (C) circuit is expressed in milliseconds (msec). The lower that value the better the antistatic character or charge mobility of the applied antistatic layer.

The present invention is illustrated by the following examples without, however, limiting it thereto. The ratios and percentages are by weight unless otherwise indicated.

In the examples, described hereafter, following preparation were used:

Preparations I to IV (I) Preparation of 3,4-ethylenedioxy-thiophene

The 3,4-disubstituted thiophenes of the above general formula (II) can be obtained by processes known in principle by reacting the alkali metal salts of 3,4-dihydroxy-thiophene-2,5-dicarboxylic esters with the appropriate alkylene vic-dihalides and subsequently decarboxylating the free 3,4-(alkylene-vic-dioxy)thiophene-2,5-dicarboxylic acids (see, for example, Tetrahedron (1967) Vol. 23, 2437–2441 and J. Am. Chem. Soc. 67 (1945) 2217–2218).

(II a) Preparation of poly(3,4-ethylenedioxy-thiophene)/polyanion dispersion called hereinafter dispersion (PT1)

a) Into 1000 ml of an aqueous solution of 7 g of polystyrene sulfonic acid (109 mmol of $SO_3H$ groups) with number-average molecular weight (Mn) 40,000, were introduced 12.9 g of potassium peroxidisulfate ($K_2S_2O_8$), 0.1 g of $Fe_2(SO_4)_3$ and 2.8 g of 3,4-ethylenedioxy-thiophene. The thus obtained reaction mixture was stirred for 24 h at 20° C. and subjected to desalting.

b) The above prepared reaction mixture was stirred for 6 hours at room temperature in the presence of a granulated weak basic ion exchange resin LEWATIT H 600 (tradename of the Bayer Company of Leverkusen, Gemany) and strongly acidic ion exchanger LEWATIT S 100 (tradename of the Bayer Company of Leverkusen, Germany). After said treatment the ion exchange resins were filtered off and the potassium ion and sulfate ion content were measured which were respectively 0.4 g $K^+$ and <0.1 g $(SO_4)^{2-}$ per liter.

(II b) Preparation of poly(3,4-ethylenedioxy-thiophene)/polyanion dispersion called hereinafter dispersion (PT2)

a) Into 1000 ml of an aqueous solution of 14 g of polystyrene sulfonic acid (218 mmol of $SO_3H$ groups) with number-average molecular weight (Mn) 40,000, were introduced 12.9 g of potassium peroxidisulfate ($K_2S_2O_8$), 0.1 g of $Fe_2(SO_4)_3$ and 5.68 g of 3,4-ethylenedioxy-thiophene. The thus obtained reaction mixture was stirred for 24 h at 20° C. and subjected to desalting.

b) 500 ml of the above prepared reaction mixture were diluted with 500 ml of water and stirred for 6 hours at room temperature in the presence of a granulated weak basic ion exchange resin LEWATIT H 600 (tradename of Bayer AG, Leverkusen, Gemany) and strongly acidic ion exchanger LEWATIT S 100 (tradename of Bayer AG, Leverkusen, Germany). After said treatment the ion exchange resins were filtered off and the potassium ion and sulfate ion content were measured which were respectively 0.4 g $K^+$ and 0.1 g $(SO_4)^{2-}$ per liter.

(III) Preparation of the Copolyester Latex P (III a) Preparation of Compound CA

In a 1-liter round-bottomed flask with a stirrer, a reflux-condenser, a thermometer and dropping funnel were introduced 41.8 g (0.2 mole) of 5-amino-isophthalic acid dimethyl ester, 18.48 g (0.22 mole) of sodium hydrogen carbonate and 400 ml of anhydrous acetone. The mixture is heated under reflux for a short time and then cooled down again to room temperature. At that temperature 15.5 g (0.1 mole) of succinylchloride dissolved in 25 ml of anhydrous acetone were added dropwise whilst stirring. The reaction product precipitated during that operation. The whole mixture was then kept stirring for 1 h at room temperature and for 1 h at reflux temperature. Thereupon the reaction mixture was cooled in ice and the precipitated reaction product separated by suction filtering and dried in vacuum.

The crude product can be purified by washing with water and recrystallization from dimethylformamide.

In the polycondensation reaction for forming the copolyester the above polyfunctional carboxylic acids increase the Tg-value of the copolyester. Properly chosen proportions of sulpho groups, the degree of polycondensation and cross-linking provide the required dispersibility in water of the copolyester.

(III b) Preparation of the Copolyester P

A reaction mixture of:
1027.2 g of dimethyl terephthalate (5.295 moles)
775 g of dimethyl isophthalate (3.995 moles)
207.2 g of 5-sulphoisophthalic acid dimethyl ester sodium salt (0.7 mole)
polycarboxylic acid methyl ester compound CA (0.01 mole)
1240 g of ethylene glycol (20 moles)
220 mg of zinc acetate dihydrate, and
292 mg of antimony(III)oxide
was heated to 160° C. whilst stirring in a nitrogen atmosphere.

At that temperature re-esterification started and methanol was distilled. Gradually the temperature was raised to 250° C. over a period of 3 to 4 h, until no methanol distilled anymore. Thereupon the temperature was further raised to 255° C. and the reaction mixture subjected to a reduced pressure of 0.1–0.2 mm Hg. Under these conditions the polycondensation took place within a period of about 60 to 100 min. After cooling the solidified copolyester was milled and obtained in powder form. Depending on the time of polycondensation the intrinsic viscosity of the copolyester was from 0.20 to 0.30 dl/g measured at a temperature of 25° C. in a mixture of phenol and o-dichlorobenzene (60/40 by volume). The Tq value of said copolyester is in the range of 67 to 72° C.

The preparation of an aqueous copolyester dispersion is carried out by vigorously stirring the copolyester powder in hot (90–98° C.) water. Operating that way a copolyester dispersion with average particle size smaller than 50 nm and up to 30% by weight can be obtained easily and is used as such

(IV) Preparation of Latices A, B, C and D

(IV a) Preparation of Latex A

An addition copolymer of methylmethacrylate, butadiene and itaconic acid contaning 47.5% by weight of methylmethacrylate units, 47.5% of by weight of butadiene units and 5% by weight of itaconic acid units is prepared as a latex by classical emulsion polymerisation conducted in aqueous medium in the presence of an initiator compound. A common initiator compound is a water-soluble persulphate or a redox system based e.g. on hydrogen peroxide and a ferrous salt. A survey of initiators used in emulsion polymerization is given in High Polymers 9, Emulsion Polymerization, Interscience Publishers, Inc., New York, 1955.

(IV b) Preparation of Latex B

An addition copolymer of methylmethacrylate, butadiene and itaconic acid contaning 67.5% by weight of methylmethacrylate units, 27.5% of by weight of butadiene units and 5% by weight of itaconic acid units is prepared as a latex as described under (IV a).

(IV c) Preparation of Latex C

An addition copolymer of vinylidenecholride, methylmethacrylate and itaconic acid contaning 88% by weight of vinylidenechloride units, 10% of by weight of methylmethacrylate units and 2% by weight of itaconic acid units is prepared as a latex as described under (IV a).

(IV d) Preparation of Latex D

A mixture of 36 ml of 10% aqueous solution of HOSTAPAL B [tradename of Hoechst Aktiengesellschaft, Frankfurt, Germany for nonyl-phenyl (oxyethylene)$_5$—O—SO$_3$Na] and 1314 ml of water was heated to 85° C. while nitrogen gas was bubbled through. 77 ml of methyl methacrylate and 22.5 ml of a 2% aqueous solution of $K_2S_2O_8$ were added and the reaction mixture was stirred for 30 minutes. Thereupon an additional amount of 306 ml of methyl methacrylate and 45 ml of 2% aqueous solution of $K_2S_2O_8$ were added simultaneously and dropwise over a period of 30 minutes. Then stirring of the reaction mixture was continued for 2 h at 85° C.

The solids content of the latex was 20.2% and the average particle size of the dispersed polymethyl methacrylate particles was 88.8 nm.

The glass transition temperature (Tg) of the obtained polymethyl methacrylate was: 122° C.

EXAMPLES 1 TO 6

Preparation of the Coating Compositions

Using the above defined copolyester latex (P), latices A, B and C and the poly(3,4-ethylenedioxy-thiophene) dispersion (PT1) of preparation (IIa) in a aqueous solution in amounts (in ml) as indicated in following tabel 1, coating compositions 1 to 6 of examples 1 to 6 were prepared.

TABLE 1

| Ingredient | Coating compositions of Examples | | | | | |
|---|---|---|---|---|---|---|
| | 1 | 2 | 3 | 4 | 5 | 6 |
| Dispersion PT1 | 205 | 205 | 205 | 163 | 163 | 199 |
| Copolyester latex P | 119 | 119 | 119 | 0 | 0 | 0 |
| Latex A | 33 | 33 | 0 | 0 | 0 | 0 |
| Latex B | 0 | 0 | 35 | 0 | 0 | 0 |
| Latex C | 0 | 0 | 0 | 132 | 119 | 189 |
| Surfactant A* | 10 | 10 | 10 | 0 | 0 | 0 |
| Surfactant B* | 0 | 0 | 0 | 51 | 51 | 31.6 |
| Sorbitol | 7.7 | 7.7 | 7.7 | 7.7 | 7.7 | 9.4 |
| N-Methylpyrrolidone | 15 | 15 | 15 | 15 | 15 | 0 |
| Furancarboxylic acid | 0 | 3 | 0 | 0 | 0 | 0 |
| KIESELSOL 100F* | 0 | 0 | 0 | 0 | 11 | 17.5 |
| Isopropanol | 26 | 26 | 26 | 0 | 0 | 0 |
| Water | 574 | 571 | 570 | 620 | 620 | 547 |
| NH$_4$OH 25% in water | 0 | 0 | 0 | 0 | up to pH = 4 | |

*Surfactant A: 4.5% aqueous solution of octylfenoxypolyglycolacetic acid sold by CHEMY company of the Netherlands under the tradename of AKYPO-OP-80
*Surfactant B: 9.25 g of a sulfonated linear alkyl chain on basis of paraffin, sold by the BAYER AG, Germany under the tradename MERSOLAT H76 and 43.5 g of heptadecylbenzimidazole disulfonic acid, disodium salt, sold by CIBA-GEIGY AG, Switserland under the tradename ULTRAVON W mixed in 800 ml water and 200 ml ethanol.
*KIESELSOL 100F: tradename for a colloidal SiO$_2$ dispersion, particle size of SiO$_2$: 25 to 30 nm, sold by BAYER AG, Germany.

Coating Procedure

Six test coatings with the compositions 1 to 6 were prepared as follows: The coating compositions as described in table 1 were coated to a longitudinally stretched polyethylene terephtalate film support having a thickness of approximately 0.34 mm by air-knife coating. The compositons 1 to 5 were applied to said support at a coverage of 60 m$^2$/liter, composition 6 was applied to said support at a coverage of 90 m$^2$/liter. The layer was dried in a hot air stream whereafter the film with coating compositions 1 to 5 was stretched transversally to 3.3 times its original width and the film with coating composition 6 was stretched to 3.5 times its original width at a temperature of about 87° C. in a tenter frame. The final thickness of the film was about 0.100 mm. The film was then conducted into an extension of the tenter frame, where it was heat-set while being kept under tension at a temperature of 190° C. for about 20 sec. After heat-setting the coated film was cooled and wound up in the normal manner.

The conductivity of the 6 samples was evaluated according to test test procedures A and B described earlier. The results in table 2 indicate that for each composition the lateral resistivity is much lower than $10^{10}$ Ω/square and that $\tau \leq 0.002$ msec.

TABLE 2

| Property | Samples of Example | | | | | |
|---|---|---|---|---|---|---|
| | 1 | 2 | 3 | 4 | 5 | 6 |
| viscosity 22°+ | 2.9 | 2.2 | 2.9 | 1.6 | 1.7 | n.a.† |
| Coating Thickness m$^2$/l | 60 | 60 | 60 | 60 | 60 | 90 |
| Stretching factor | 3.3 | 3.3 | 3.3 | 3.3 | 3.3 | 3.5 |
| Lateral resistance* | 0.010 | 0.003 | 0.020 | 0.16 | 0.002 | n.a.† |
| τ (msec) | 0.002 | <.002 | <.002 | <.002 | <.002 | <0.002 |

*at 30% R.H. expressed as $10^{10}$ (Ω/square)
†n.a.: not available,
+in cp

EXAMPLES 7 TO 12

The anstistatic layers of the materials of examples 1 to 5 were overcoated with a second subbing layer with coating thickness of 30 m²/l to give samples 7 to 11. The coating solution of the second subbing layer was composed as follows:

Gelatine 11.4 g/l
KIESELSOL 300 F (Tradename of BAYER AG, Germany for a colloidal dispersion of $SiO_2$) 28.4 g/l
1,2,6 Hexanetriol 0.75 g/l
anionic wetting agent 0.6 g/l To the above composition was added 0.15 ml of a 5.71% aqueous dispersion of a matting agent MA in the form of crosslinked polymethyl methacrylate particles having an average particle size of 1.3 μm (ref. published European patent application No. 0 466 982).

The anstistatic layer of the material of sample 6 was overcoated with an aqueous solution of latex D to give sample 12.

The aqueous solution of latex D consisted of:

| | |
|---|---|
| KELZAN S* | 0.3 g |
| NH₄OH 25% in water | 0.2 ml |
| Latex D | 31.1 ml |
| ULTRAVON W* | 10 ml |
| N-Methyl-Pyrrolidone | 24 ml |
| Water to make | 1000 ml |

To the above composition was added 0.15 ml of a 5.71% aqueous dispersion of a matting agent in the form of crosslinked polymethyl metacrylate particles having an average particle size of 1.3 μm (ref. published European patent application No. 0 466 982).

After drying and 24 h conditionning at 30% R.H. the lateral resistance and τ as described were determined. The results are given in table 3.

TABLE 3

| | Samples of Example | | | | | |
|---|---|---|---|---|---|---|
| Property | 7 | 8 | 9 | 10 | 11 | 12 |
| Lateral resistance* | 0.070 | 0.900 | 0.080 | 0.02 | 0.03 | 0.06 |
| τ (msec) | <.002 | 0.720 | 0.006 | <.002 | <.002 | 0.016 |

*at 30% R.H. expressed in $10^{10}$ Ω/square

EXAMPLES 13 TO 17

The subbed samples 7 to 11 were coated with a gelatinous backing layer to give samples 13 to 17. The samples were aged for 36 hours at 57° C. and 34% R.H., then 24 hours conditionned at 30% R.H. and 21° C. After this procedure the relative resistance and τ were measured again, before processing (BP) and after processing (AP). Also the adhesion of the wet layer was measured and adhesion tests were performed before and after processing.

In a dry adhesion test the coated layer assemblage was cut reaching the film base by means of a razor blade cutting cross-wise under an angle of 45°. An adhesive tape (TESAPACK 4122 -tradename of BEIERSDORF AG, Hamburg, Germany) was pressed on the cross-cut areas and torn off abruptly under an angle of 45°. This test is termed "tape-test". The quality of the dry adhesion was evaluated by giving the peeling off a rating from 0 to 4, wherein 0 stands for non-peeling and 4 for complete removal of the scratched emulsion layer areas.

In a wet adhesion test the coated layer assemblage was dipped for 10 minutes into water of 36° C., whereupon the layer assemblage was scratched cross-wise with a pen tip reaching the film base. The adhesion in wet state was checked by rubbing the wetted layer assemblage with finger tip for 10 seconds.

The quality of the wet adhesion was evaluated by giving the result of the rubbing a rating from 0 to 4, wherein 0 stands for non-removal and 4 for complete removal by said rubbing.

The results are given in table 4

TABLE 4

| | Samples of Examples | | | | |
|---|---|---|---|---|---|
| Property | 13 | 14 | 15 | 16 | 17 |
| Lateral resistance* BP | 0.35 | 0.32 | 0.31 | 0.32 | 0.33 |
| Lateral resistance** BP | 0.20 | 0.30 | 0.21 | 0.58 | 0.17 |
| Lateral resistance* AP | 0.52 | 0.41 | 0.26 | 0.29 | 0.29 |
| Lateral resistance** AP | n.a. | n.a. | n.a. | n.a. | 0.28 |
| τ BP, 30% RH (msec) | <.022 | 0.009 | 0.006 | <.002 | <.002 |
| τ AP, 60% RH (msec) | 0.002 | <.002 | <.002 | <.002 | <.002 |
| Adhesion (Tape test) BP | 0 | 0 | 0 | 0 | 0 |
| Wet adhesion | 0 | 0 | 0 | 0 | 0 |
| Adhesion (Tape test) AP | 0/1⁺ | 0 | 0/1⁺ | 0/1⁺ | 0 |

*at 30% R.H. expressed in $10^{10}$ Ω/square
**at 60% R.H. expressed in $10^{10}$ Ω/square
⁺delamination of the PET-support.

EXAMPLE 18

A polyester support was prepared as described in example 1, except for the fact that antistatic composition 7 (amounts in ml) was used to give sample 18:

Antistatic coating composition 7:

| | |
|---|---|
| Dispersion PT2 | 180.4 |
| Latex C | 189 |
| Surfactant B* | 30 |
| Sorbitol | 10.2 |
| KIESELSOL 100F* | 17.5 |
| Water ml | 564 |
| Viscosity 22° C. (cp) | 1.8 |
| Coating thickness (m²/l) | 90 |
| Stretching factor | 3.5 |

*Surfactant B: 925 g of a sulfonated linear alkyl chain on basis of parafin, sold by BAYER AG, Germany under the tradename MERSOLAT H76 and 43.5 g of heptadecylbenzimidazole disulfonic acid, disodium salt, sold by CIBA-GEIGY AG, Switserland under the tradename ULTRAVON W mixed in 800 ml water and 200 ml methanol.
*KIESELSOL 100F: tradename of a colloidal $SiO_2$ dispersion, particle size of $SiO_2$:25 to 30 nm, sold by the BAYER AG, Germany.

This antistatic primer layer was coated on both sides of the polyester support.

The lateral resistance of the material (sample 18) at 30% RH was 0.0003×10¹⁰ Ω/square and τ was <0.002 msec.

Sample 18 was overcoated on both sides with a second subbing layer as described in example 7, to give sample 19. The lateral resistance of the material (sample 19) at 30% R.H. was 0.12×10¹⁰ Ω/square and τ was <0.002 msec.

Sample 19 was overcoated on both sides with a gelatin-silver bromide-iodide emulsion [AgBr/AgI 98/2 mole %] was coated at a coverage of silver halide equivalent with 4.00 g of silver nitrate per m2 on each side of the support. The gelatin to silver halide ratio was 0.4, the silver halide being expressed as an equivalent amount of silver nitrate.

The average grain size of the silver halide was 0.95 μm. This resulted in sample 20. Again the lateral resistance and τ were measured before processing (BP) and after processing (AP). The results of the measurements on sample 20 are summarized in table 5

Comparative Example 1

The emulsion that was coated on sample 19 was coated on both sides of a polyester support that was subbed at both sides with a subbing layer according to U.S. Pat. No. 4,123,278, this gave sample 21. Again the lateral resistance and τ were measured before processing (BP) and after processing (AP). The results of the measurements on sample 21 are summarized in table 5.

TABLE 5

| Property | Sample N° | |
|---|---|---|
| | 20 | 21 |
| Lateral resistance BP at 30% R.H. $10^{10}$ Ω/square | 0.22 | 2400 |
| Lateral resistance BP at 50% R.H. $10^{10}$ Ω/square | 0.17 | 110 |
| τ BP at 30% R.H. in msec | <0.002 | 4400 |
| τ BP at 50% R.H. in msec | 0.009 | 530 |

Herefrom it is clear that the lateral resistance and the discharge duration τ of the photographic material having a anstistatic layer according to the present invention (sample 20) are much lower than for the comparative test subbing layer (sample 20). The antistatic properties of the samples according to the present invention are practically independent of relative humidity.

What is claimed is:

1. A method for preparing a biaxially oriented polyester sheet or web, with improved antistatic properties, comprising the steps of
   (i) stretching said polyester sheet or web first in one direction and second in a direction perpendicular thereto
   (ii) coating said hydrophobic polyester sheet or web, either before stretching or between said first and second stretching operation, on one or both sides, with a transparent antistatic primer layer, wherein the coating composition of said transparent antistatic primer layer comprises (1) a dispersion of a polythiophene with conjugated polymer backbone and a polymeric polyanion compound and (2) a latex polymer having hydrophilic functionality.

2. A method according to claim 1, wherein said polythiophene has thiophene nuclei substituted with at least one alkoxy group, or —O(CH$_2$CH$_2$O)$_n$CH$_3$ group, n being 1 to 4, or thiophene nuclei whereof two adjacent carbon atoms of the thiophene ring together with an oxy-alkylene-oxy group form an adjacent ring.

3. A method according to claim 1, wherein said polythiophene has structural units corresponding to the following general formula (I):

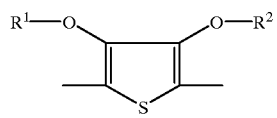

(I)

in which:
   each of R$^1$ and R$^2$ independently represents hydrogen or a C$_{1-4}$ alkyl group or together represent a member selected from the group consisting of an ethylene group, an alkyl-substituted methylene group, a C$_{1-12}$ alkyl- or phenyl-substituted 1,2-ethylene group, a 1,3-propylene group and a 1,2-cyclohexylene group.

4. A method according to claim 1, wherein said polythiophene has been prepared in the presence of said polymeric polyanion compound by oxidative polymerization of 3,4-dialkoxythiophenes or 3,4-alkylenedioxythiophenes according to the following general formula (II):

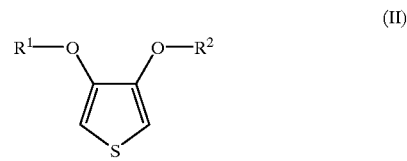

(II)

in which:
   R$^1$ and R$^2$ are as defined in claim 3.

5. A method according to claim 1, wherein said polymeric polyanion compound is a polymeric carboxylic acid or polymeric sulfonic acid or such acid in salt form.

6. A method according to claim 5, wherein said polymeric polyanion compound is a polymer comprising styrene sulfonic acid units.

7. A method according to claim 1, wherein said latex polymer having hydrophilic functionality is a copolyester that contains sulphonic acid salt groups as hydrophilic functionality.

8. A method according to claim 7, wherein said latex polymer is a copolyester containing recurring ester groups derived from ethylene glycol and an acid mixture containing (i) terephthalic acid, (ii) isophthalic acid, (iii) 5-sulphoisophthalic acid whose sulpho group is in salt form and (iv) a polyfuctional acid producing crosslinks.

9. A method according to claim 8, wherein said acid mixture containing terephthalic acid, isophthalic acid and 5-sulphoisophthalic acid whose sulpho group is in salt form and a polyfuctional acid producing crosslinks consists essentially of from 20 to 60 mole % of isophthalic acid, 6 to 10 mole % of said sulphoisophthalic acid, 0.05 to 1 mole % of cross-linking agent being an aromatic polycarboxylic acid compound having at least three carboxylic acid groups or corresponding acid generating anhydride or ester groups, the remainder in said acid mixture being terephthalic acid.

10. A method according to claim 1, wherein said latex polymer having hydrophilic functionality is an addition (co)polymer having hydrophilic functionality.

11. A method according to claim 10, wherein said addition copolymer is a copolymer formed from 45 to 70% by weight of a lower (C1–C4) alkyl methacrylate, 25 to 50% by weight of butadiene and from 2 to 5% by weight of an ethylenically unsaturated carboxylic acid.

12. A method according to claim 10, wherein said addition copolymer is a copolymer formed from 60 to 90% by weight of vinylidenechloride, 9 to 30% of a lower (C1–C4) alkyl methacrylate and from 1 to 5% by weight of an ethylenically unsaturated carboxylic acid.

* * * * *